United States Patent [19]
Cook et al.

[11] Patent Number: 5,283,831
[45] Date of Patent: Feb. 1, 1994

[54] METHOD OF SYNCHRONIZING THE PSEUDO-RANDOM BINARY SEQUENCE IN A DESCRAMBLER

[75] Inventors: Andrew R. J. Cook, Essex; David W. Faulkner, Suffolk, both of England

[73] Assignee: British Telecommunications, London, Great Britain

[21] Appl. No.: 915,860

[22] PCT Filed: Apr. 10, 1991

[86] PCT No.: PCT/GB91/00570
§ 371 Date: Aug. 3, 1992
§ 102(e) Date: Aug. 3, 1992

[87] PCT Pub. No.: WO91/15910
PCT Pub. Date: Oct. 17, 1991

[30] Foreign Application Priority Data
Apr. 10, 1990 [GB] United Kingdom ............... 9008151

[51] Int. Cl.$^5$ .................................................. H04K 1/00
[52] U.S. Cl. .................................... 380/48; 380/46; 380/43
[58] Field of Search ................ 380/20, 21, 43, 44, 380/46, 48, 49, 50

[56] References Cited
U.S. PATENT DOCUMENTS

| | | | |
|---|---|---|---|
| 4,383,322 | 5/1983 | Halpern et al. | 375/1 |
| 4,606,042 | 8/1986 | Kahn et al. | |
| 5,060,266 | 10/1991 | Dent | 380/49 X |
| 5,068,872 | 11/1991 | Schroter | 380/46 X |
| 5,128,998 | 7/1992 | Kurihara | 380/46 |

FOREIGN PATENT DOCUMENTS

| | | |
|---|---|---|
| 0094254 | 11/1983 | European Pat. Off. |
| 0107175 | 5/1984 | European Pat. Off. |
| 3312400 | 9/1984 | Fed. Rep. of Germany |

*Primary Examiner*—Tod R. Swann
*Attorney, Agent, or Firm*—Nixon & Vanderhye

[57] ABSTRACT

In a data communication system a signal is coded with n-bit codewords, wherein n is an integer. The codewords are converted to a serial bit-stream and scrambled using a PRBS (Pseudo-Random Binary Sequence) from a PRBS generator (4). The PRBS sequence has a length n x m where m is an integer. At a receiver the serial data is descrambled using a corresponding binary sequence from a PRBS generator (5) matched to that in the transmitter. The descrambling data is decoded in a decoder (6) in synchronism with the binary sequence in the generator (5), thereby maintaining word alignment between the transmitter and the receiver.

6 Claims, 2 Drawing Sheets

METHOD OF SYNCHRONIZING THE PSEUDO-RANDOM BINARY SEQUENCE IN A DESCRAMBLER

BACKGROUND

1. Field of the Invention

The present invention relates to the communication of digitally encoded data, and in particular to systems in which the data is scrambled in accordance with a binary sequence before transmission. As described below, the present invention has been found to be particularly advantageous in connection with the encoding of video signals but is also applicable to different forms of data.

2. Related Art and Other Considerations

It has previously been proposed to scramble encoded video data prior to transmission by combining at an XOR gate the outputs of a coder and a PRBS (pseudo-random binary sequence) generator. The scrambled data can then be read only at a receiver having a matching descrambler. The coder may encode the input signal using, for example 5-bit hybrid DPCM (differential pulse code modulation) as described in the paper by M. C. W. Van Buul, "Hybrid D-PCM, A combination of DPCM and PCM", IEEE Trans. on Communications, Vol. COM-26, No. 3, 3/78 pp 362–8. The parallel 5-bit codewords output by such a coder are converted to a serial bit-stream before being scrambled by the pseudo-random code sequence. Then at the receiver the serial data is unscrambled using a matching PRBS generator before being assembled into 5-bit codewords which are decoded to reconstitute the original video signal.

In order to descramble the data correctly it is necessary that the PRBS generator in the receiver should be aligned with that in the transmitter so that corresponding bits in the pseudo-random sequence are applied to the same elements of data in the scrambler and descrambler. As described in the present applicant's earlier British applications numbers 8804552 and 8721603, this is achieved by searching for a video line synchronisation or frame alignment word, or other predetermined fixed component of the received data and aligning the PRBS generator accordingly. While this is sufficient to ensure appropriate descrambling of the serial data it is also necessary to ensure that the conversion of the serial data to parallel 5-bit words is carried out in correct alignment with the transmitter to avoid corruption of the data. This may be achieved by adding extra synchronization bits to the video data but this gives rise to an undesirable overhead in the transmission rate. Alternatively it has been proposed to replace some of the least significant bits of the video signal with synchronization words. This however introduces small but regular errors into the video signal which may be visible when that signal is reconstituted.

SUMMARY

According to the present invention there is provided a method of communicating data from a transmitter to a receiver comprising coding an input signal with n-bit codewords, where n is an integer, converting the n-bit codewords to a serial bit-stream, generating with a pseudo-random binary sequence generator in the transmitter a fixed length n x m bit pseudo-random binary sequence, where m is an integer, generating a word synchronization signal in response to a predetermined point in each repetition of the pseudo-random binary sequence in said transmitter pseudo-random binary sequence generator, synchronizing the coding of the input signal in accordance with the word synchronization signal, scrambling the serial bit-stream with the pseudo-random binary sequence, transmitting the scrambled data to the receiver, generating with a pseudo-random binary sequence generator in the receiver a corresponding binary sequence, generating a corresponding word alignment signal in response to the predetermined binary sequence, descrambling the data at the receiver with the corresponding binary sequence, synchronizing the corresponding binary sequence to the scrambling sequence in the transmitter, and assembling the descrambled data into n-bit words in accordance with said corresponding word alignment signal, thereby maintaining word alignment between the transmitter and the receiver.

The method of the present invention scrambles the data using a repeating PRBS having a fixed length which is an integral multiple of the length of the codewords. For example, in the case of the 5-bit codewords discussed above a PRBS length of 255 bits is used, giving 16 orthogonal PRBS sequences. Since an integral number of codewords fits inside each PRBS frame a fixed phase relationship can be maintained between the codewords and the PRBS frame. For example, the PRBS generator and the encoder outputting the codewords can be aligned so that the first bit of the PRBS sequence always corresponds to the first bit of a codeword. This has the important consequence that in the receiver word alignment can be maintained simply by synchronizing the decoder with the descrambling PRBS sequence. The need for an additional synchronization method for the decoder and the consequent disadvantages of additional transmission overheads or degradation in the data are therefore avoided.

Preferably, the receiver pseudo-random binary sequence generator is driven by a controllable oscillator means, and the synchronization of said corresponding binary sequence is obtained by detecting at the receiver a predetermined element in the received data, and locking the frequency of the oscillator means in response to the detection of the predetermined element.

The predetermined element may be fixed bit pattern or alternatively a marker signal superimposed in the analogue domain.

According to a further aspect of the present invention there is provided a system for communicating data comprising a transmitter including a coder arranged to code an input signal with n-bit codewords, where n is an integer, and to convert the n-bit codewords to a serial bit-stream, and scrambling means including a pseudo-random binary sequence generator and arranged to scramble the serial bit-stream with a fixed length n x m bit pseudo-random binary sequence, where m is an integer, to output the scrambled data and to provide a word synchronization signal in response to a predetermined point in each repetition of the pseudo-random binary sequence, the coder being arranged to synchronize the coding of the input signal in accordance with the word synchronization signal; and a receiver arranged to receive the scrambled data and including descrambling means including a pseudo-random binary sequence generator and arranged to descramble the data with a corresponding binary sequence and to provide a corresponding word synchronization signal in response to a predetermined point in each repetition of the corresponding binary sequence, means to synchronize the descrambling means with the scrambling means, and decoder means arranged to assemble the descrambled data into n-bit words in accordance with said corresponding word alignment signal, thereby maintaining word alignment between the transmitter and the receiver.

Preferably, the receiver pseudo-random binary sequence generator is driven by a controllable oscillator means, and the receiver further comprises monitor means arranged to detect at the receiver a predetermined element in the received data and the oscillator means is responsive to the output of the monitor means to lock its frequency in response to detection of the predetermined element.

Preferably the pseudo-random binary sequence in the transmitter and the receiver is a maximum length sequence.

BRIEF DESCRIPTION OF THE DRAWINGS

A method and system in accordance with the present invention will now be described in detail with reference to the accompanying drawings in which.

DETAILED DESCRIPTION OF THE DRAWINGS

Figure 1:
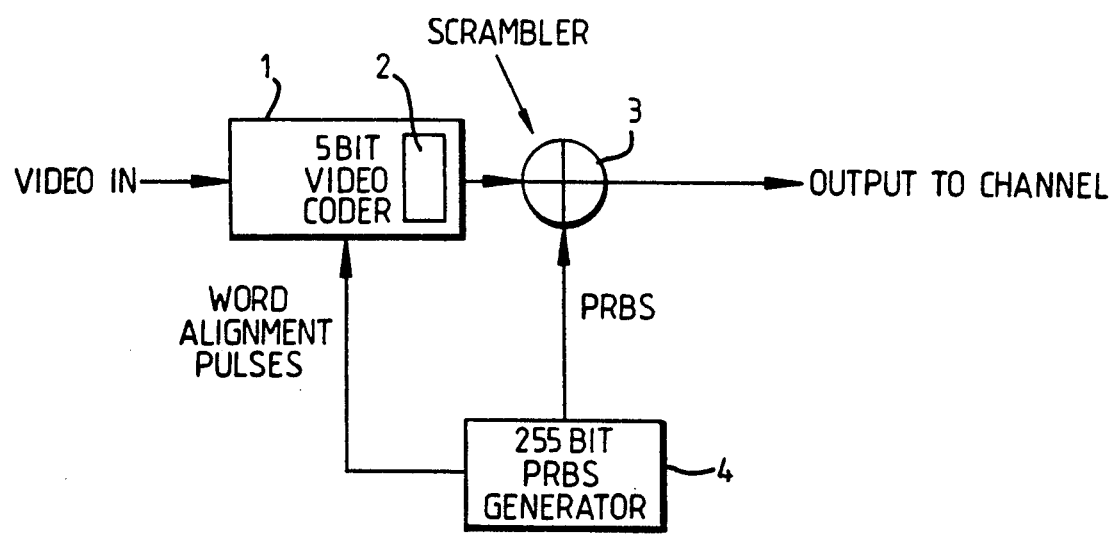
FIG. 1 is a block diagram of a data transmitter.

As shown in FIG. 1, a video signal is input to a coder 1 which, in the present example, codes the data using a hybrid differential pulse code modulation (HDPCM) scheme. The coding scheme produces 5-bit codewords which are converted into a serial bit-stream by a parallel-to-serial converter 2. The resulting serial data is combined at an XOR gate 3 with a fixed length pseudo-random binary sequence output by a PRBS generator 4. This scrambles the output data using the cipher-stream scrambling technique described in the publication "Cipher System", Beker H. & Piper F., Northwood Book, 1982, pp. 180-198. The scrambled data is then output onto the transmission channel, which in the present example is a passive optical network (not shown).

In the present example, the PRBS sequence used by the generator 4 is 255 bits long. The length is chosen so that an integral number of video frames fit inside each PRBS frame. A 25-bit sequence makes possible 16 orthogonal PRBS sequences and so this system can support 16 different channels. Other sequence lengths are possible. The next longest suitable sequence in a 5-bit coder is 4095 bits and this will support many more different channels. The present invention may also be applied to other codec word lengths, but only odd numbers of bits are suitable for use with sequences which are of length $2'-1$, where k is an integer, i.e. m-sequences. For example, a 3-bit codec may be used with a 63-bit, 255-bit, 1023-bit, or 4095-bit PRBS, a 7-bit codec with a 4095-bit PRBS or a 9-bit codec with a 4095-bit PRBS. In all cases the PRBS sequence length is an integral multiple of the word lengths, making it possible to maintain a fixed phase relationship between the PRBS generator and the coder at the word-level. It is possible therefore to use the PRBS generator 4 to clock the coder 1, by generating a word alignment pulse at a fixed point in each repetition of the binary sequence. This may be done using logic circuitry to detect, for example, the point at which the sequence ends and repetition occurs and generating a pulse accordingly.

Figure 2:
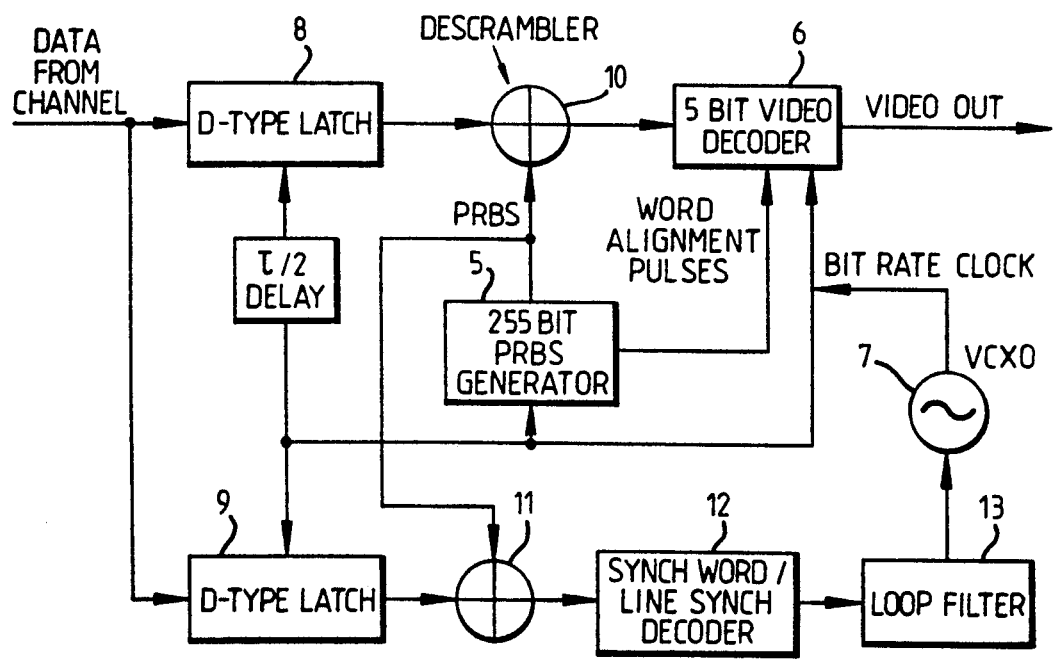
FIG. 2 is a block diagram of a data receiver.

FIG. 2 shows a data receiver which, using a PRBS generator 5 matched to that in the transmitter and a decoder 6, descrambles and decodes the data received from the transmission channel. The receiver includes a voltage controlled crystal oscillator (VCXO) 7 which generates a bit-rate clock for the decoder 6.

The incoming serial data is fed in parallel to two D-type latches 8,9 which are clocked by the VCXO 7 but with a phase difference of one half of a bit period between them. The output from one latch 8 is taken to an XOR gate 10 where it is combined with the output of the receiver PRBS generator 5. The descrambled data leaving the XOR gate 10 is then input to the decoder 6 where it is assembled into 5-bit words and decoded using a process complementary to that adopted in the coder 1. The video signal is then reconstituted and output.

The data from the other latch 9 is used in synchronizing the receiver PRBS generator 5 to the PRBS generator used int eh transmitter 1 to scramble the data. The output from this latch 9 is combined with the output from the PRBS generator 5 at a further XOR gate 11. The output from the XOR gate 11 is analysed by a synchronization, constituting the monitor means of the present invention, which is arranged to monitor the data to detect the occurrence of a predetermined synchronization word which will have been added to the video data in the coder 1: alternatively a line synchronization signal may be detected. The absence of such a word indicates that the data is being corrupted by an error in alignment between the PRBS generators 4, 5 in the transmitter and receiver. Each time the predetermined word is detected the monitor 12 provides to a loop filter 13 a logic "one" control pulse. The loop filter 13, which is designed to ensure the stability of the control loop, provides the time average of its input signal to the VCXO 7 to advance or retard its phase and hence achieve locking of the oscillator frequency. In this manner any error in phase is corrected and the receiver PRBS generator 5 is kept locked in alignment with the transmitter generator 4. The VCXO 7 and the loop filter 13 together constitute a controllable oscillator means of the present invention.

As an alternative to the arrangement discussed above, the monitor 12 may receive scrambled data and align the PRBS generator on the basis of a detected feature of those scrambled data.

Just as in the transmitter, a fixed phase relationship can be maintained between the decoder 6 and the generator 5 as a result of the PRBS generator frame being an integral multiple of the codeword length. Since the receiver PRBS generator 5 is synchronized to the transmitter generator 4 which is in turn aligned with the coder 1 at the word level, it is sufficient to align the decoder 6 to the generator 5 in order to achieve word alignment across the system. The decoder 6 is aligned to the generator 5 using logic circuits to generate a word alignment pulse, in the same manner as described above for the transmitter.

We claim:
1. A method of communicating data from a transmitter to a receiver comprising coding an input signal with n-bit codewords, where n is an integer, converting the n-bit codewords to a serial bit-stream, generating with a pseudo-random binary sequence generator in the transmitter a fixed length n x m bit pseudo-random binary sequence, where m is an integer, generating a word synchronization signal in response to a predetermined point in each repetition of the pseudo-random binary sequence in said transmitter pseudo-random binary se- quence generator, synchronizing the coding of the input signal in accordance with the word synchronization signal, scrambling the serial bit-stream with the pseudo-random binary sequence, transmitting the scrambled data to the receiver, generating with a pseudo-random binary sequence generator in the receiver a corresponding binary sequence, generating a corresponding word alignment signal in response to the predetermined point in each repetition of the corresponding binary sequence, descrambling the data at the receiver with the corresponding binary sequence, synchronizing the corresponding binary sequence to the scrambling sequence in the transmitter, and assembling the descrambled data into n-bit words in accordance with said corresponding word alignment signal, thereby maintaining word alignment between the transmitter and the receiver.

2. A method according to claim 1, in which the receiver pseudo-random binary sequence generator is driven by a controllable oscillator means, and the synchronization of said corresponding binary sequence is obtained by detecting at the receiver a predetermined element in the received data, and locking the frequency of the oscillator means in response to the detection of the predetermined element.

3. A method according to claim 1, in which the generated pseudo-random binary sequence is a maximum length sequence.

4. A system for communicating data comprising a transmitter including a coder arranged to code an input signal with n-bit codewords, where n is an integer, and to convert the n-bit codewords to a serial bit-stream, and scrambling means including a pseudo-random binary sequence generator and arranged to scramble the serial bit-stream with a fixed length n x m bit pseudo-random binary sequence, where m is an integer to output the scrambled data and to provide a word synchronization signal in response to a predetermined point in each repetition of the pseudo-random binary sequence, the coder being arranged to synchronize the coding of the input signal in accordance with the word synchronization signal; and a receiver arranged to receive the scrambled data and including descrambling means including a pseudo-random binary sequence generator and arranged to descramble the data with a corresponding binary sequence and to provide a corresponding word synchronization signal in response to the predetermined point in each repetition of the corresponding binary sequence, means to synchronize the descrambling means with the scrambling means, and decoder means arranged to assemble the descrambled data into n-bit words in accordance with said corresponding word alignment signal, thereby maintaining word alignment between the transmitter and the receiver.

5. A system according to claim 4, in which the receiver pseudo-random binary sequence generator is driven by a controllable oscillator means, and the receiver further comprises monitor means arranged to detect at the receiver a predetermined element in the received data and the oscillator means is responsive to the output of the monitor means to lock its frequency in response to detection of the predetermined element.

6. A system according to claim 4 or claim 5, in which the pseudo-random binary sequence generators are arranged to generate a maximum length sequence.

* * * * *